Patented Nov. 28, 1922.

1,436,828

UNITED STATES PATENT OFFICE.

CLARENCE V. STEINHART, OF WESTFIELD, NEW JERSEY.

LOW-FREEZING-POINT COMPOSITION.

No Drawing. Application filed January 17, 1922. Serial No. 529,923.

*To all whom it may concern:*

Be it known that I, CLARENCE V. STEIN-HART, a citizen of the United States, and a resident of Westfield, county of Union, and State of New Jersey, have invented certain new and useful Improvements in Low-Freezing-Point Compositions, of which the following is a specification.

My invention relates in general to materials for lowering the freezing point of water. The material, according to my invention, is intended to be dissolved in water to produce a solution which may be used without danger of freezing, for refrigerating and other purposes under conditions where water alone might freeze. A common example of such use is found in the cooling medium circulation in refrigerating plants, where ordinary salt brine is commonly employed. As is well known, calcium chloride offers greater reduction of freezing point and it has been adopted for installations where its chemical properties are not subjected to changes such as the production of insoluble compounds or objectionable free acid. Attempts have been made to employ calcium chloride as a freezing point lowering ingredient in automobile radiators, but in this field, the requirements are particularly difficult to satisfy both on account of chemical considerations and physical requirements.

My invention is adapted to numerous uses of the kind suggested above, and has been found to satisfy even the difficult requirements for use in radiators of automobile engines and it may be successfully employed in quantities sufficient to produce a solution of low enough freezing point for severe winter temperatures, while at the same time avoiding the production of corrosive acid or precipitates. To clearly illustrate the nature of my invention, I may describe the same with reference to certain types of composition which I have found successful.

One composition, which I have produced and tested, comprises as a principal ingredient magnesium chloride. This salt alone and the alkaline earth chlorides in general have the disadvantage under ordinary conditions of producing corrosive acid and frequently insoluble compounds, which would seriously impair their value for the purpose in view. Accordingly, I add to the chloride another compound in smaller quantity, which would have the property of taking up the free acid and preventing the formation of a precipitate. In the case of magnesium chloride I may add, for example, a smaller quantity of neutral sodium chromate, which will take up the free acid as it slowly forms and produce soluble reaction products instead of insoluble salts. The sodium chromate will, for example, gradually be converted to the bichromate, whereas the magnesium and sodium components will, to some extent, be converted into magnesium chromate and sodium chloride, both of which are soluble, and hence avoid the formation of precipitates in the cooling solution. Other neutral chromates of alkali metals may be employed with similar results. I may use, for example, with a given quantity of magnesium chloride in the form of crystals 10% thereof, by weight, of anhydrous sodium chromate or a corresponding quantity of the crystallized sodium chromate. These ingredients may be melted together at low enough temperature to prevent the formation of magnesium oxide. I have accomplished the desired purpose by heating the magnesium chloride at 96° C. to cause it to melt or dissolve in its own water of crystallization and mixed with this 20% by weight of crystallized sodium chromate or 10% by weight of anhydrous chromate, the latter being, perhaps, preferable as the resulting homogeneous mixture or solution solidifies better when allowed to cool and is thus in more convenient and practical form for the market. The mixture or solution thus obtained is entirely soluble in water with sufficient concentration to produce a solution having a freezing point low enough for all ordinary winter temperatures. I have, for example, dissolved five pounds of the material in one gallon of water and cooled the solution to —28° C. without any indication of freezing. The sodium chromate fuses or dissolves in the magnesium chloride rather slowly, but the operation is facilitated by stirring or agitation so that the resultant mass becomes homogeneous.

The solution made from the above compotion has been subjected to boiling while contact with copper, tin and iron without any apparent precipitate being formed. The neutral sodium chromate serves, at the same time, the function of an indicator, inasmuch as it changes to the bichromate with a characteristic color change so that, in practice, the exhaustion of what I may term the safe acid absorbing or neutralizing capacity of the solution may readily be detected by observation of the color.

It is possible—though I believe not preferable—to employ other alkaline earth chlorides as, for example, calcium chloride, under certain conditions. The neutral chromate of alkali metal may be employed with, for example, calcium chloride by first dissolving calcium chloride in glycerine. I have, for example, dissolved 100 grams of calcium chloride crystals in 15 c. c. of glycerine and introduced into the resulting solution the neutral sodium chromate by boiling, using, for example, the ingredients in the proportions of 100 grams commercial calcium chloride, one gram neutral sodium chromate and 15 c. c. of glycerine. By first producing the solution of calcium chloride in glycerine, the sodium chromate may be introduced without the formation of a precipitate of calcium chromate and the resultant composition may be dissolved in water to produce a low freezing point solution. The composition may also be made by incorporating glycerine in a saturated water solution of calcium chloride crystals and thereafter inducing a mixture of neutral sodium chromate and glycerine, with the same results. The watery solution may be safely concentrated by boiling up to about 160° C., without carbonizing the organic content.

I prefer, however, when using calcium chloride to employ a substance like borax rather than the neutral sodium chromate. In this form of the invention, glycerine is to used in small quantity and it has the property of preventing the precipitation of calcium borate. When calcium chloride and borax are brought together in solution, a ready precipitate of calcium borate is formed. Even after this precipitate has formed the addition of a small quantity of glycerine will cause the precipitated borate to redissolve and remain indefinitely in solution even at the temperature of boiling. As a specific example of the calcium chloride glycerine and borax composition, I may mention the following proportions:—

10 c. c. $H_2O$.
100 g. $CaCl_2$ (crystals).
1.5 c. c. glycerine.
2.5 g. borax.

A small quantity of caustic soda, for example, one-half gram, may be incorporated with the above ingredients if desired to provide additional acid neutralizing properties. The above mixture may be heated, for example, at the boiling point of water to thoroughly incorporate the ingredients into a homogeneous mass which, when poured and allowed to cool, will form a solid cake which can be broken up into fragments if desired for packing. This mass is readily soluble in water and will produce a low freezing point solution according to the quantities dissolved, and the solution may be used in automobile radiators without danger of corrosion or formation of precipitates to clog the radiator passages. A little methylene blue or similar coloring matter added to the composition or solution will minimize the appearance of deposits that may be left on outside metal or other surfaces when the solution has boiled over in use, as sometimes occurs.

In the compositions above described, it is to be noted that a quantity of neutral chromate of alkali-metal, or borax, is variable according to the quantity of free acid which it is intended to neutralize. The invention is, therefore, not to be understood as being limited to any specified minimum quantity of neutral chromate or borax. The quantities of the various compositions to dissolve in water are not in themselves restricted except in accordance with the extent to which the user is desirous of lowering the freezing point.

I claim:—

1. A composition soluble in water for the purpose described, comprising an alkaline earth chloride, alkali metal salt for neutralizing free corrosive acid and glycerine.

2. A composition soluble in water for the purpose described, comprising an alkaline earth chloride, borax and glycerine.

3. A composition soluble in water for the purpose described, comprising calcium chloride, borax and glycerine.

CLARENCE V. STEINHART.